United States Patent
Issaev et al.

(10) Patent No.: US 7,285,356 B2
(45) Date of Patent: Oct. 23, 2007

(54) NON-AQUEOUS ELECTROCHEMICAL CELLS

(75) Inventors: Nikolai N. Issaev, Woodbridge, CT (US); Michael Pozin, Brookfield, CT (US)

(73) Assignee: The Gillette Company, Boston, MA (US)

( * ) Notice: Subject to any disclaimer, the term of this patent is extended or adjusted under 35 U.S.C. 154(b) by 433 days.

(21) Appl. No.: 10/898,469

(22) Filed: Jul. 23, 2004

(65) Prior Publication Data

US 2006/0019161 A1    Jan. 26, 2006

(51) Int. Cl.
*H01M 4/50*    (2006.01)

(52) U.S. Cl. ............... 429/224; 429/221; 429/231.95; 429/231.1; 429/245; 429/338; 429/337; 429/330; 429/333; 429/331

(58) Field of Classification Search ............... 429/224, 429/231.95, 231.1, 330, 331, 333, 337, 221, 429/245, 338

See application file for complete search history.

(56) References Cited

U.S. PATENT DOCUMENTS

| | | | | |
|---|---|---|---|---|
| 6,053,953 | A * | 4/2000 | Tomiyama et al. .... | 429/231.95 |
| 6,090,506 | A * | 7/2000 | Inoue et al. ............ | 429/231.1 |
| 2003/0124421 | A1* | 7/2003 | Issaev et al. ................ | 429/224 |
| 2004/0096746 | A1* | 5/2004 | Wietelmann et al. ....... | 429/324 |
| 2005/0202320 | A1* | 9/2005 | Totir et al. .................. | 429/245 |

* cited by examiner

*Primary Examiner*—Laura Weiner
(74) *Attorney, Agent, or Firm*—Fish & Richardson P.C.

(57) ABSTRACT

Electrochemical cells are disclosed. In some embodiments, an electrochemical cell includes a cathode having less than about 2,000 ppm of water, an anode, and an electrolyte having a first lithium salt and $LiPF_6$.

16 Claims, 6 Drawing Sheets

Digital camera test (RT). 2/3A cells.

Digital camera test (0°C). 2/3A cells.

Coin Cells (Fresh). Al cathode screen.
100 Ohms simulation (1.5 mA). Electrolyte: A - Control,
B - 0.54M LiTFS + 0.36M LiPF$_6$ + 0.25% LiClO$_4$, C - 1M LiPF$_6$.

Coin Cells (Fresh). Al cathode screen.
HEC simulation (60 mA pulse). Electrolyte: A - Control,
B - 0.54M LiTFS + 0.36M LiPF$_6$ + 0.25% LiClO$_4$, C - 1M LiPF$_6$.

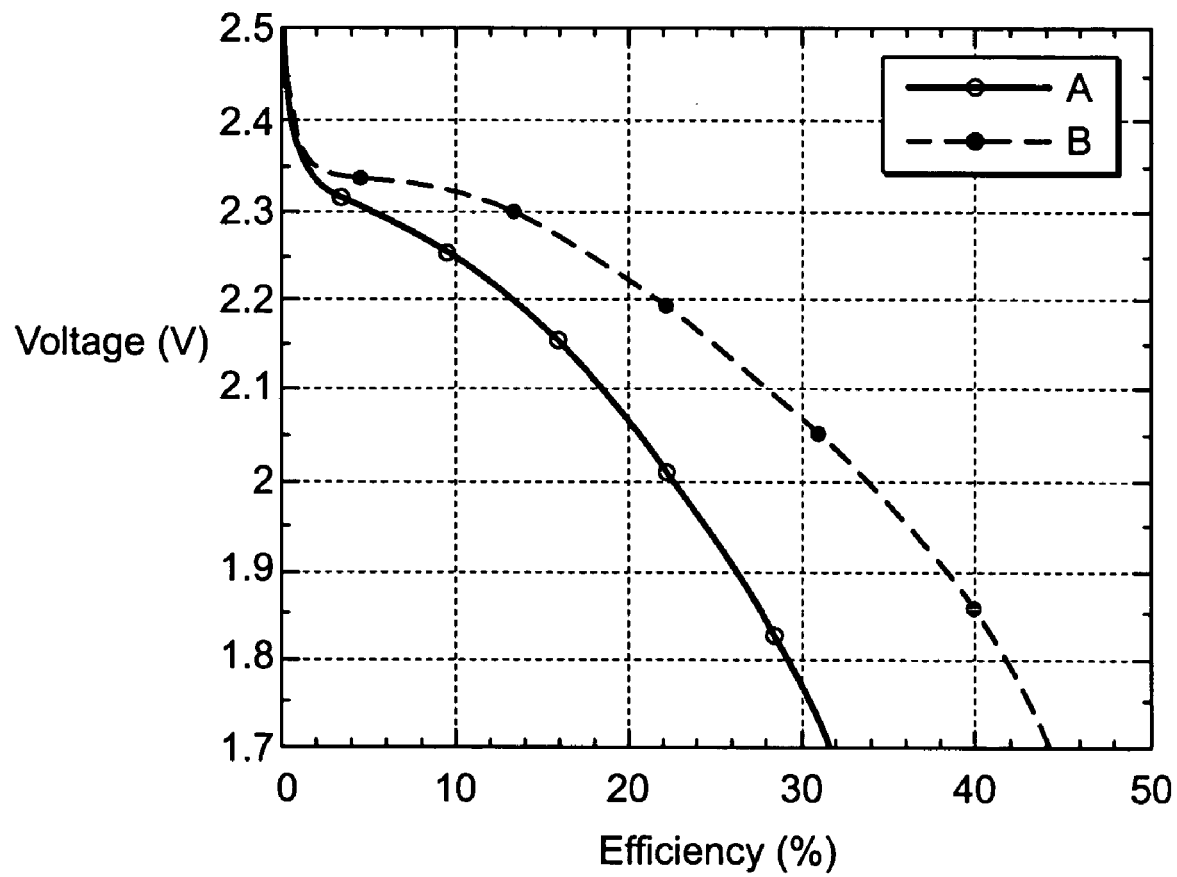

NON-AQUEOUS ELECTROCHEMICAL CELLS

TECHNICAL FIELD

The invention relates to non-aqueous electrochemical cells.

BACKGROUND

Batteries or electrochemical cells are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material.

When a battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

SUMMARY

In one aspect, the invention features an electrochemical cell, including a cathode having less than about 2,000 ppm of water, an anode, and an electrolyte containing a first lithium salt and $LiPF_6$. By restricting the water content of the cathode, the occurrence of $LiPF_6$ hydrolyzing to form hydrofluoric acid, a highly corrosive agent, is reduced.

At the same time, the cell has good performance, for example, at low temperatures, after freshly produced, and/or after prolonged storage at elevated temperatures. The electrochemical cell is capable of having a wide range of voltage stability and high conductivity. In embodiments, such as those that include aluminum component(s), $LiPF_6$, with or without other electrolyte components, is capable of reducing corrosion of the component(s). The electrolyte is relatively inexpensive.

In another aspect, the invention features an electrochemical cell, including a cathode having manganese oxide, the cathode having less than about 2,000 ppm of water; an anode including lithium; and an electrolyte including lithium trifluoromethanesulfonate and $LiPF_6$ salts.

Aspects of the invention may include one or more of the following features. The cathode can have less than about 1,500 ppm of water, such as less than about 1,000 ppm of water, or less than about 500 ppm of water. The cathode can include manganese oxide. The anode can include lithium. The cell can be a primary cell.

Various embodiments of the electrolyte can be used. The first lithium salt can include lithium trifluoromethanesulfonate, such as, in mole fraction, from about 5% to about 95% of the lithium trifluoromethanesulfonate. The electrolyte can further include a third lithium salt, such as $LiClO_4$ and/or lithium-bis(oxalato)borate. The electrolyte can include from about 300 to about 10,000 ppm of $LiClO_4$. The cell can further include an aluminum surface. The electrolyte can further include ethylene carbonate, propylene carbonate, dimethoxyethane, and/or butylene carbonate. The electrolyte can further include propylene carbonate and dimethoxyethane, such as from about 30% to about 90% by weight of dimethoxyethane. The electrolyte can include, by weight, from about 5% to about 30% of ethylene carbonate, and from about 30% to about 90% dimethoxyethane. The electrolyte can further include ethylene carbonate, butylene carbonate, and dimethoxyethane, such as, by weight, from about 5% to about 30% of ethylene carbonate, and from about 30% to about 90% of dimethoxyethane. The electrolyte can include dioxolane.

In another aspect, the invention features a method including discharging an electrochemical cell including a cathode having manganese oxide, the cathode having less than about 2,000 ppm of water, an anode comprising lithium, and an electrolyte containing lithium trifluoromethanesulfonate and $LiPF_6$ salts; and disposing the cell without recharging the cell.

Other aspects, features, and advantages are in the description, drawings, and claims.

DESCRIPTION OF DRAWINGS

FIG. 6 is a graph showing load voltage versus efficiency for stored test cells having aluminum cathode screens under an HEC (60 mA pulse) simulation.

DETAILED DESCRIPTION

Figure 1:
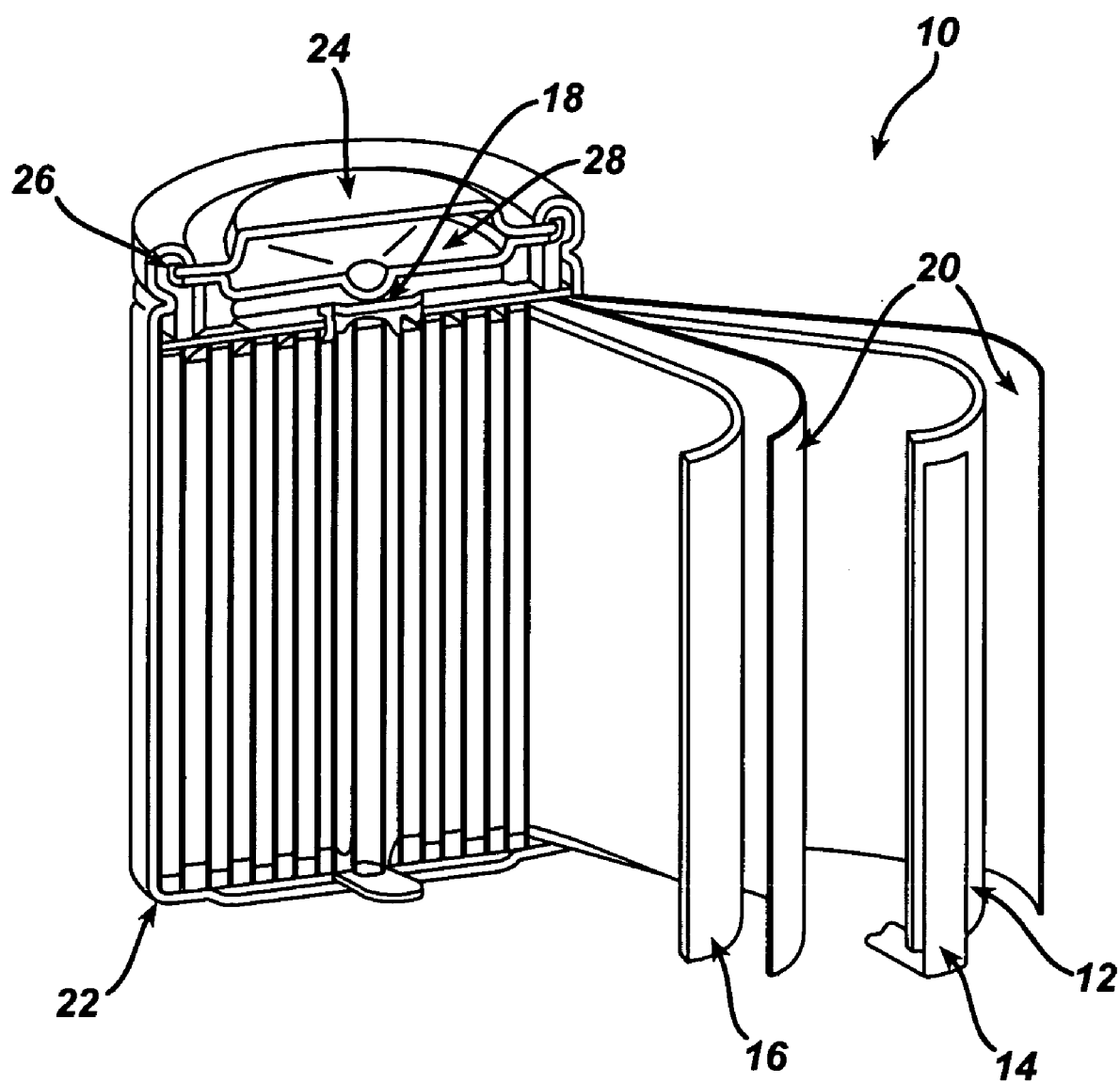
FIG. 1 is a sectional view of a nonaqueous electrochemical cell.

Referring to FIG. 1, an electrochemical cell 10 (such as a primary lithium cell) includes an anode 12 in electrical contact with a negative lead 14, a cathode 16 in electrical contact with a positive lead 18, a separator 20 and an electrolytic solution. Anode 12, cathode 16, separator 20 and the electrolytic solution are contained within a case 22. The electrolytic solution includes a solvent system and a salt that is at least partially dissolved in the solvent system. Electrochemical cell 10 further includes a cap 24 and an annular insulating gasket 26, as well as a safety valve 28.

The electrolytic solution or electrolyte can be in liquid, solid or gel (e.g., polymer) form. The electrolyte can contain an organic solvent such as propylene carbonate (PC), ethylene carbonate (EC), dimethoxyethane (DME), butylene carbonate (BC), dioxolane (DO), tetrahydrofuran (THF), acetonitrile ($CH_3CN$), gamma-butyrolactone, diethyl carbonate (DEC), dimethyl carbonate (DMC), ethyl methyl carbonate (EMC), dimethylsulfoxide (DMSO), methyl acetate (MA), methyl formiate (MF), sulfolane, or combinations thereof. The electrolyte can alternatively contain an inorganic solvent such as $SO_2$ or $SOCl_2$. The electrolyte also can contain one or more lithium salts, such as lithium trifluoromethanesulfonate (LiTFS), $LiPF_6$, lithium-bis(oxalato)borate (LiBOB), and/or $LiClO_4$.

In preferred embodiments, the electrolyte includes a salt mixture having LiTFS and $LiPF_6$. The total concentration of salts in the mixture of solvent(s) can range from about 0.3

M to about 1.2 M. The total concentration of LiTFS and LiPF$_6$ in the mixture of solvent(s) can be equal to or greater than about 0.30 M, 0.35 M, 0.40 M, 0.45 M, 0.50 M, 0.55 M, 0.60 M, 0.65 M, 0.70 M, 0.75 M, 0.80 M, 0.85 M, 0.90 M, 0.95 M, 1.00 M, 1.05 M, 1.10 M, or 1.15 M; and/or equal to or greater than about 1:2 M, 1.15 M, 1.10 M, 1.05 M, 1.00 M, 0.95 M, 0.90 M, 0.85 M, 0.80 M, 0.75 M, 0.70 M, 0.65 M, 0.60 M, 0.55 M, 0.50 M, 0.45 M, 0.40 M, or 0.35M. Of the total concentration of LiTFS and LiPF$_6$ salts, the concentration of LiTFS in the mixture of solvents can be (in mole fraction) from about five percent to about 95 percent. For example, the concentration of LiTFS in the mixture of solvents can be (in mole fraction) equal to or greater than five percent, ten percent, 15 percent, 20 percent, 25 percent, 30 percent, 35 percent, 40 percent, 45 percent, 50 percent, 55 percent, 60 percent, 65 percent, 70 percent, 75 percent, 80 percent, 85 percent, or 90 percent; and/or equal to or less than 95 percent, 90 percent, 85 percent, 80 percent, 75 percent, 70 percent, 65 percent, 60 percent, 55 percent, 50 percent, 45 percent, 40 percent, 35 percent, 30 percent, 25 percent, 20 percent, 15 percent, or ten percent. The concentration of LiPF$_6$ in the mixture of solvents can be equal to 100 percent minus the concentration of LiTFS in the mixture of solvents. For example, if the total concentration of salt in the mixture of solvents is 0.5 M, and the LiTFS concentration (in mole fraction) in the mixture of solvents is 90 percent (i.e., 0.45 M), then the LiPF$_6$ concentration in the electrolyte mixture is ten percent (i.e., 0.05 M).

In some embodiments, the electrolyte further includes one or more other salts. For example, the electrolyte can further include other lithium salts, such as LiClO$_4$ and/or LiBOB. Lithium perchlorate (LiClO$_4$) can reduce (e.g., inhibit or suppress) the occurrence of corrosion, such as when cell 10 includes an aluminum component (e.g., an aluminum cathode current collector) or an aluminum couple. A couple generally includes at least two metal or metal alloy surfaces that are in electrical contact with each other. As an example, cathode 16 can include an aluminum current collector that is in electrical contact with positive lead 18, which can be made of steel. The two metal surfaces that are in electrical contact with each other can have the same composition (e.g., both surfaces can be made of the same metal or metal alloy (e.g., both surfaces are made of aluminum)), or can have different compositions (e.g., the two surfaces can be made of different metals or metal alloys (e.g., one surface is made of aluminum and the other surface is made of an alloy of aluminum)). A surface can have an interface between two portions having the same composition. The interface can have a different composition than the portions, e.g., due to wetting and diffusion. In some embodiments, the electrolyte includes from about 300 ppm to about 10,000 ppm (relative to electrolyte) of a third salt (e.g., LiClO$_4$) in addition to LiTFS and LiPF$_6$. The electrolyte can include equal to or greater than about 300 ppm, 1,000 ppm, 2,000 ppm, 3,000 ppm, 4,000 ppm, 5,000 ppm, 6,000 ppm, 7,000 ppm, 8,000 ppm, or 9,000 ppm of the third salt; and/or less than or equal to about 10,000 ppm, 9,000 ppm, 8,000 ppm, 7,000 ppm, 6,000 ppm, 5,000 ppm, 4,000 ppm, 3,000 ppm, 2,000 ppm, or 1,000 ppm of the third salt.

In addition to the salts, the electrolyte includes a mixture of one or more solvents. Examples of solvent mixtures include DME and PC; EC, PC, and DME; EC, BC, and DME; and dioxolane. In a mixture of solvents having DME and PC, the concentration of DME in the mixture of solvents can range from about 30 percent to about 90 percent by weight. The concentration of DME in the mixture of solvents can be equal to or greater than about 30 percent, 35 percent, 40 percent, 45 percent, 50 percent, 55 percent, 60 percent, 65 percent, 70 percent, 75 percent, 80 percent by weight, or 85 percent by weight; and/or equal to or less than about 90 percent, 85 percent, 80 percent, 75 percent, 70 percent, 65 percent, 60 percent, 55 percent, 50 percent, 45 percent, 40 percent, or 35 percent by weight. The concentration of PC in the mixture of solvents can be equal to 100 percent minus the concentration of DME. For example, if the concentration of DME in the mixture of solvents is 75 percent by weight, then the concentration of PC in the mixture of solvents is 25 percent by weight. If the concentration of DME in the mixture of solvents is 50-75 percent by weight, then the concentration of PC in the mixture of solvents is 25-50 percent by weight.

In a mixture of solvents including EC, DME and PC, the concentration of EC in the mixture of solvents can be from about five percent to about 30 percent by weight. The concentration of EC in the mixture of solvents can be equal to or greater than five percent, ten percent, 15 percent, 20 percent, or 25 percent by weight; and/or equal to or less than 30 percent, 25 percent, 20 percent, 15 percent, or ten percent by weight. The concentration of DME in the mixture of solvents can range from about 30 percent to about 90 percent by weight. The concentration of DME in the mixture of solvents can be equal to or greater than 30 percent, 35 percent, 40 percent, 45 percent, 50 percent, 55 percent, 60 percent, 65 percent, 70 percent, 75 percent, 80 percent, or 85 percent by weight; and/or equal to or less than about 90 percent, 85 percent, 80 percent, 75 percent, 70 percent, 65 percent, 60 percent, 55 percent, 50 percent, 45 percent, 40 percent, or 35 percent by weight. The concentration of PC in the mixture of solvents can be equal to 100 percent minus the concentration of EC and DME. For example, if the concentration of EC in the mixture of solvents is 15 percent by weight, and the concentration of DME in the mixture of solvents is 60 percent by weight, then the concentration of PC in the mixture of solvents is 25 percent by weight. Examples of an EC:DME:PC solvent mixture are 14:62:24 and 10:75:15 percent by weight.

A mixture of solvents including EC:BC:DME can have generally the same concentrations described above as for EC:PC:DME, respectively.

Cathode 16 includes an active cathode material, which is generally coated on the cathode current collector. The current collector can include a steel, such as a stainless steel (e.g., a series 200 stainless steel, a 300 series stainless steel, a 400 series stainless steel, or cold rolled steel); aluminum (e.g., in the form of an aluminum foil); an alloy including aluminum; titanium; or nickel. In some embodiments, the current collector can be a metal grid. The current collector generally has at least one dimension (e.g., a length, a width, and/or a diameter) that is greater than about 0.2 millimeter (e.g., greater than about 0.5 millimeter, greater than about one millimeter, greater than about 1.5 millimeters, greater than about two millimeters). The active material can be, e.g., a metal oxide, a halide, or a chalcogenide; alternatively, the active material can be sulfur, an organosulfur polymer, or a conducting polymer. Specific examples include manganese oxides (such as MnO$_2$), cobalt oxides, manganese spinels, V$_2$O$_5$, CoF$_3$, molybdenum-based materials such as MoS$_2$ and MoO$_3$, FeS$_2$, SOCl$_2$, S, and (C$_6$H$_5$N)$_n$ and (S$_3$N$_2$)$_n$, where n is at least two. The active material can also be a carbon monofluoride. An example is a compound having the formula CF$_x$, where x is from 0.5 to one, or higher. The active material can be mixed with a conductive material such as carbon and a binder such as polytetrafluoroethylene (PTFE) or Kraton (available from Shell). An example of a cathode is one that includes aluminum foil coated with $MnO_2$. The cathode can be prepared as described in U.S. Pat. No. 4,279,972. Specific cathode materials are a function of, e.g., the type of cell (such as primary or secondary).

In preferred embodiments, cathode 16 contains a low amount of water. Without wishing to be bound by theory, it is believed that in the presence of water, $LiPF_6$ hydrolyzes to form hydrofluoric acid, which tends to corrode the components of cell 10 at an accelerated rate. By reducing the amount of water in cathode 16, the formation of hydrofluoric acid is reduced, thereby enhancing the performance of cell 10. In some embodiments, cathode 16 includes less than about 2,000 ppm of water. For example, cathode 16 can include less than about 1,500 ppm, 1,000 ppm, or 500 ppm of water. In comparison, certain cathode materials, such as manganese dioxide, can contain up to 2% by weight water. The amount of water in cathode 16 can be controlled, for example, by only exposing the cathode to dry environments, such as a dry box, and/or by heating the cathode material (e.g., at about 200° C. under vacuum). Manganese oxide cathode material is available from, for example, Kerr McGee, Delta, or ChemMetals. In some embodiments, the water content in cell 10 can be slightly higher than the water content of cathode 16, such as when the electrolyte contains a small amount of water (e.g., a maximum of about 50 ppm).

As used herein, the water content of cathode 16 is determined experimentally using standard Karl Fisher titrimetry. For example, moisture detection can be performed using a Mitsubishi moisture analyzer (such as CA-05 or CA-06) with a pyrolizing unit (VA-05 or VA-21) set at 110-115° C.

Anode 12 can include an active anode material, usually in the form of an alkali metal (e.g., lithium, sodium, potassium) or an alkaline earth metal (e.g., calcium, magnesium). The anode can include an alloy of an alkali metal (e.g., lithium) and an alkaline earth metal or an alloy of an alkali metal and aluminum. The anode can be used with or without a substrate. The anode also can include an active anode material and a binder. In this case an active anode material can include tin-based materials, carbon-based materials, such as carbon, graphite, an acetylenic mesophase carbon, coke, a metal oxide and/or a lithiated metal oxide. The binder can be, for example, PTFE. The active anode material and binder can be mixed to form a paste which can be applied to the substrate of anode 12. Specific anode materials are a function of, for example, the type of cell (such as primary or secondary).

Separator 20 can be formed of any of the standard separator materials used in electrochemical cells. For example, separator 20 can be formed of polypropylene (e.g., nonwoven polypropylene or microporous polypropylene), polyethylene, a polysulfone, or combinations thereof.

Case 22 can be made of a metal (e.g., aluminum, an aluminum alloy, nickel, nickel plated steel) or a plastic (e.g., polyvinyl chloride, polypropylene, polysulfone, ABS or a polyamide).

Positive lead 18 and/or cap 24 can be made of, for example, aluminum, nickel, titanium, or steel.

Electrochemical cell 10 can be a primary cell or a secondary cell. Primary electrochemical cells are meant to be discharged, e.g., to exhaustion, only once, and then discarded. Primary cells are not intended to be recharged. Primary cells are described, for example, in David Linden, Handbook of Batteries (McGraw-Hill, 2d ed. 1995). Secondary electrochemical cells can be recharged for many times, e.g., more than fifty times, more than a hundred times, or more. In some cases, secondary cells can include relatively robust separators, such as those having many layers and/or that are relatively thick. Secondary cells can also be designed to accommodate for changes, such as swelling, that can occur in the cells. Secondary cells are described, e.g., in Falk & Salkind, "Alkaline Storage Batteries", John Wiley & Sons, Inc. 1969; U.S. Pat. No. 345,124; and French Patent No. 164,681, all hereby incorporated by reference.

To assemble the cell, separator 20 can be cut into pieces of a similar size as anode 12 and cathode 16, and placed between the electrodes, as shown in FIG. 1. Anode 12, cathode 16, and separator 20 are then placed within case 22, which is then filled with the electrolytic solution and sealed. One end of case 22 is closed with cap 24 and annular insulating gasket 26, which can provide a gas-tight and fluid-tight seal. Positive lead 18 connects cathode 16 to cap 24. Safety valve 28 is disposed in the inner side of cap 24 and is configured to decrease the pressure within electrochemical cell 10 when the pressure exceeds some predetermined value. Additional methods for assembling the cell are described in U.S. Pat. Nos. 4,279,972; 4,401,735; and 4,526,846.

Other configurations of electrochemical cell 10 can also be used, including, e.g., the coin cell configuration. The electrochemical cells can be of different voltages, e.g., 1.5 V, 3.0 V, or 4.0 V.

The invention is further described in the following examples, which do not limit the scope of the invention described in the claims. In the examples, the cells were assembled using the procedures described in U.S. Ser. No. 10/719,056; U.S. Ser. No. 10/719,025; and U.S. Ser. No. 10/719,014, all filed Nov. 24, 2003, and all incorporated by reference.

EXAMPLE 1

Figure 2:
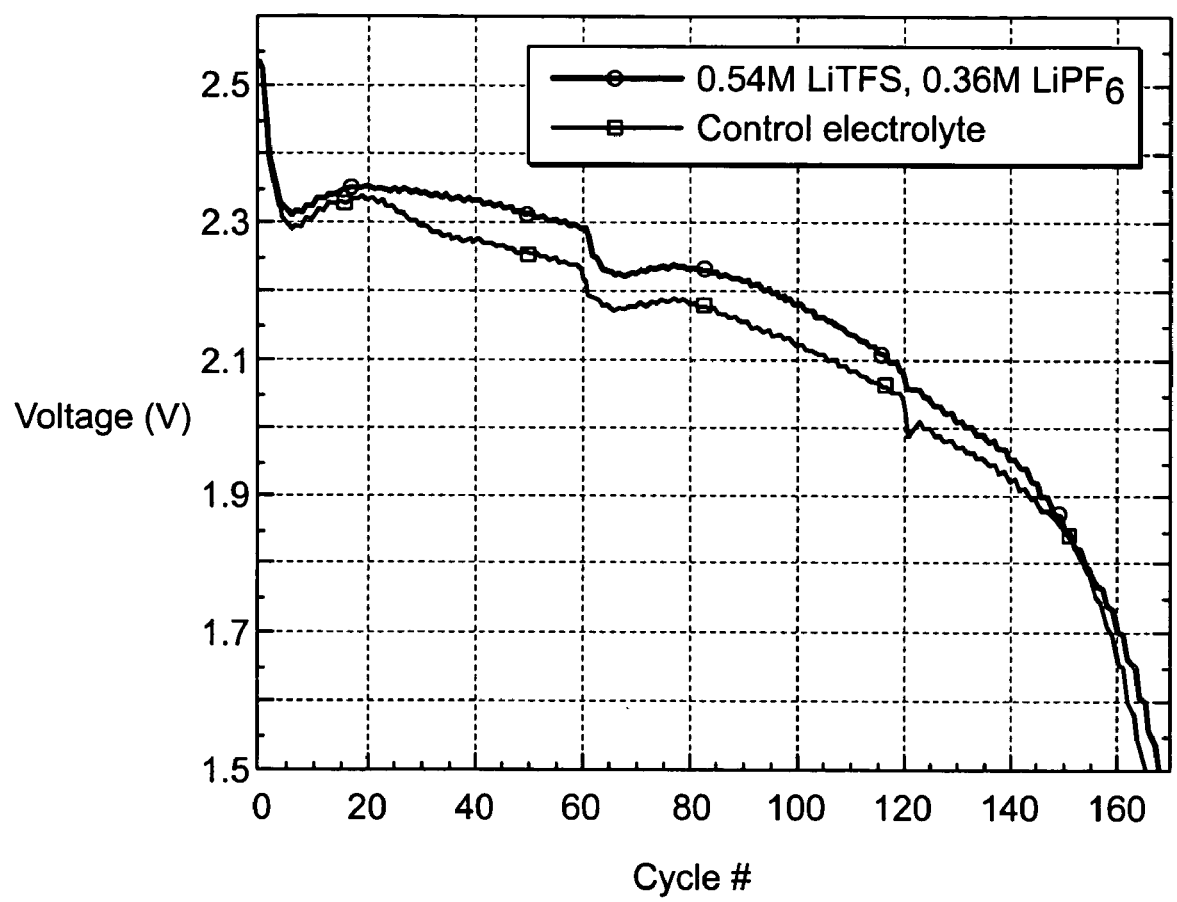
FIG. 2 is a graph showing load voltage versus number of cycles for test cells under a "digital camera" test at room temperature.

Referring to FIG. 2, a graph showing voltage under highest power load versus number of cycles for test cells under a "digital camera" test at room temperature is shown. The digital camera test is used to simulate working conditions of a digital camera. The test includes subjecting the test cells to a number of pulses under constant power withdrawal and measuring voltage. The test was performed using an Arbin testing system, available from Arbin Co.

Test cells including $LiTFS/LiPF_6$ salts were compared with test cells including LiTFS/LiTFSI. Ten 2/3A cells filled with a battery grade electrolyte, supplied by Ferro Co., having 0.54M LiTFS and 0.36M $LiPF_6$ salts were tested. For comparison, ten 2/3A cells filled with an electrolyte (battery grade), supplied by Ferro Co., having 0.54M LiTFS and 0.36M LiTFSI salts were used as control cells.

As shown in FIG. 2, the cells including 0.54M LiTFS and 0.36M $LiPF_6$ salts exhibited performance similar to the control cells. Corresponding performance data for the digital camera test at room temperature at different voltage cutoffs (VCO) are presented in a Table 1.

TABLE 1

| Test | Electrolyte | Capacity (Fresh) | |
|---|---|---|---|
| | | Cycle | Ah |
| RT, 2.0 VCO | 0.54M LiTFS, 0.36M LiTFSI | 130 | 0.892 |
| | 0.54M LiTFS, 0.36M $LiPF_6$ | 135 | 0.921 |
| RT, 1.7 VCO | 0.54M LiTFS, 0.36M LiTFSI | 161 | 1.131 |
| | 0.54M LiTFS, 0.36M $LiPF_6$ | 163 | 1.136 |

TABLE 1-continued

| Test | Electrolyte | Capacity (Fresh) Cycle | Ah |
|---|---|---|---|
| RT, 1.5 VCO | 0.54M LiTFS, 0.36M LiTFSI | 168 | 1.182 |
| | 0.54M LiTFS, 0.36M LiPF$_6$ | 168 | 1.180 |

EXAMPLE 2

Figure 3:
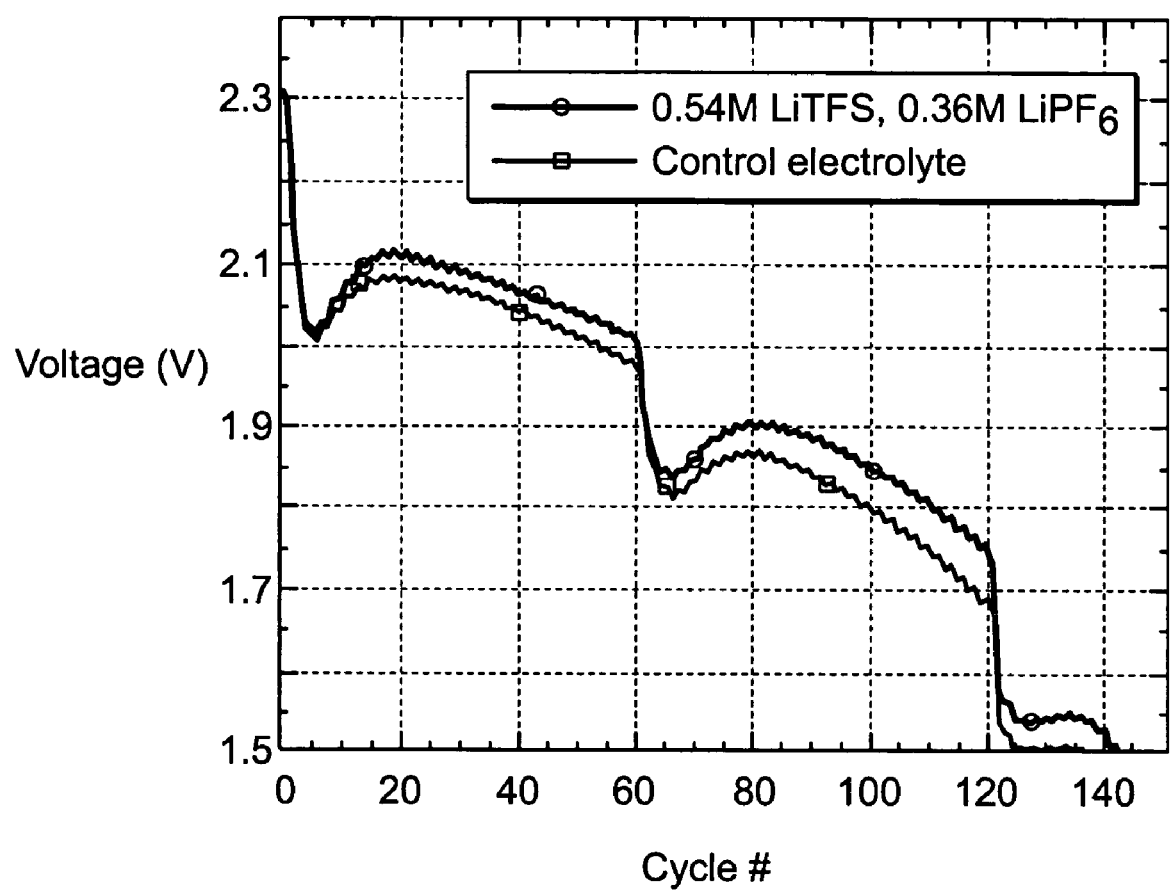
FIG. 3 is a graph showing load voltage versus number of cycles for test cells under a "digital camera" test at zero degrees Celsius.

Referring to FIG. 3, a graph showing voltage under highest power load versus number of cycles for test cells under the digital camera test at zero degrees Celsius is shown.

Test cells including LiTFS/LiPF$_6$ salts were compared with test cells including LiTFS/LiTFSI salts. Ten 2/3A cells filled with a battery grade electrolyte, supplied by Ferro Co., having 0.54M LiTFS and 0.36M LiPF$_6$ salts were tested. For comparison, ten 2/3A cells filled with an electrolyte (battery grade), supplied by Ferro Co., having 0.54M LiTFS and 0.36M LiTFSI salts were used as control cells.

As shown in FIG. 3, the cells including 0.54M LiTFS and 0.36M LiPF$_6$ salts exhibited performance similar to the control cells. Corresponding performance data for the digital camera test at zero degrees Celsius at different voltage cutoffs (VCO) are presented in Table 2.

TABLE 2

| Test | Electrolyte | Capacity (Fresh) Cycle | Ah |
|---|---|---|---|
| 0° C., 2.0 VCO | 0.54M LiTFS, 0.36M LiTFSI | 32 | 0.227 |
| | 0.54M LiTFS, 0.36M LiPF$_6$ | 33 | 0.233 |
| 0° C., 1.7 VCO | 0.54M LiTFS, 0.36M LiTFSI | 118 | 0.889 |
| | 0.54M LiTFS, 0.36M LiPF$_6$ | 112 | 0.842 |
| 0° C., 1.5 VCO | 0.54M LiTFS, 0.36M LiTFSI | 130 | 0.987 |
| | 0.54M LiTFS, 0.36M LiPF$_6$ | 128 | 0.981 |

EXAMPLE 3

Figure 4:
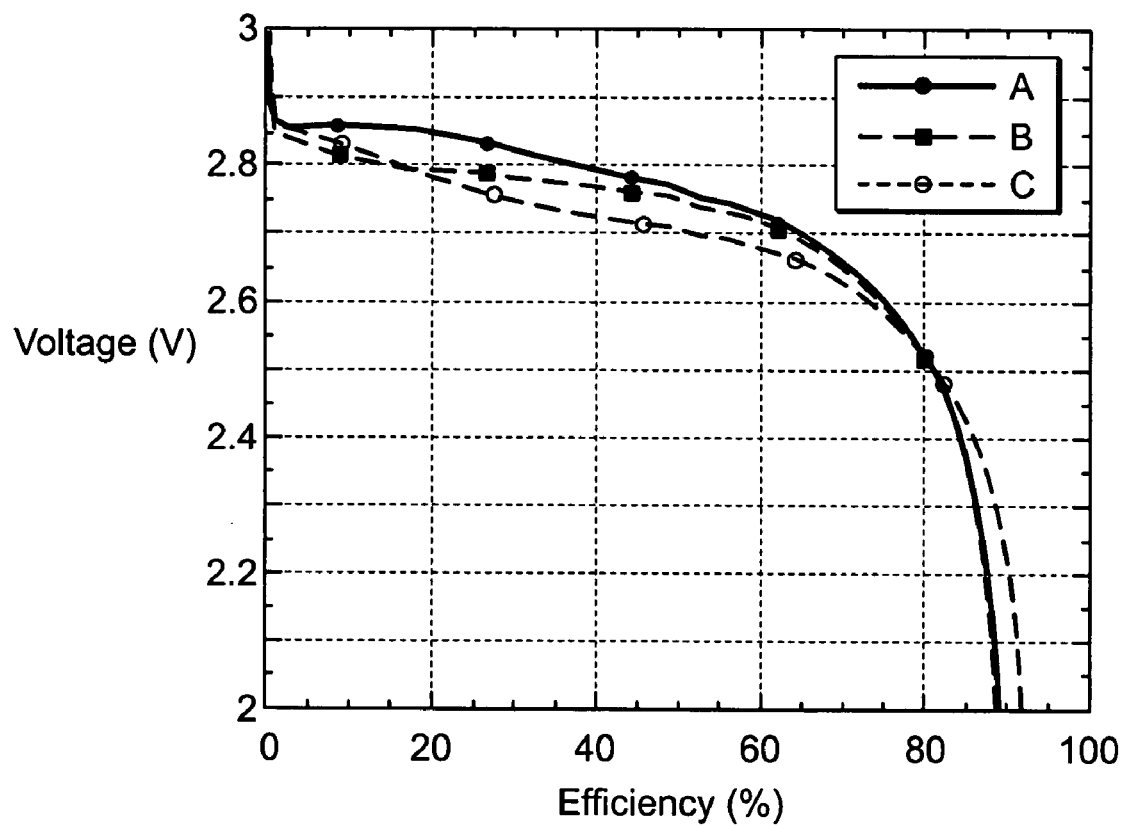
FIG. 4 is a graph showing load voltage versus efficiency for fresh coin cells having aluminum cathode screens under a 100 Ohm (1.5 mA) simulation.

Referring to FIG. 4, a graph showing running voltage versus efficiency for fresh coin cells having an aluminum screen as a cathode current collector under a 100 Ohm coin cell test is shown. The 100 Ohm coin cell test is used to simulate conditions of a 100 Ohm test for 2/3A cells. The test includes subjecting the test cells to constant current discharge (current is scaled down based on active material weight in a cathode) and measuring voltage. The test was performed using an Arbin testing system, available from Arbin Co.

Test cells including LiTFS/LiPF$_6$/LiClO$_4$ salts were compared with test cells including LiTFS/LiClO$_4$ salts and test cells including LiPF$_6$ salts. Ten 2430 coin cells filled with an electrolyte (battery grade) supplied by Ferro Co. having 0.54M LiTFS, 0.36M LiPF$_6$, and 0.025% by weight LiClO$_4$ were tested. The LiClO$_4$ salt was added to the electrolyte to suppress corrosion of aluminum. For comparison, ten 2430 coin cells filled with an electrolyte (battery grade) supplied by Ferro Co. having 1 M LiPF$_6$ salt were also tested. Ten 2430 coin cells filled with an electrolyte (battery grade) supplied by Ferro Co. having 0.64M LiTFS and 0.025% by weight LiClO$_4$ salts were used as control cells.

As shown in FIG. 4, the 2430 coin cells including 0.54M LiTFS, 0.36M LiPF$_6$, 0.025% by weight LiClO$_4$ and 1 M LiPF$_6$ exhibited performance similar to the control cells. Efficiency was calculated as a ratio of delivered capacity to a theoretical capacity. Corresponding performance data for 100 Ohm simulation test at different voltage cutoffs (VCO) are presented in a Table 3.

TABLE 3

| Electrolyte | Efficiency, % (2.0 VCO) | Efficiency, % (1.5 VCO) |
|---|---|---|
| 0.64M LiTFS, 0.025% by weight LiClO$_4$ | 88.87 | 92.81 |
| 0.54M LiTFS, 0.36M LiPF$_6$, 0.025% by weight LiClO$_4$ | 91.21 | 94.93 |
| 1M LiPF$_6$ | 90.29 | 93.75 |

EXAMPLE 4

Figure 5:
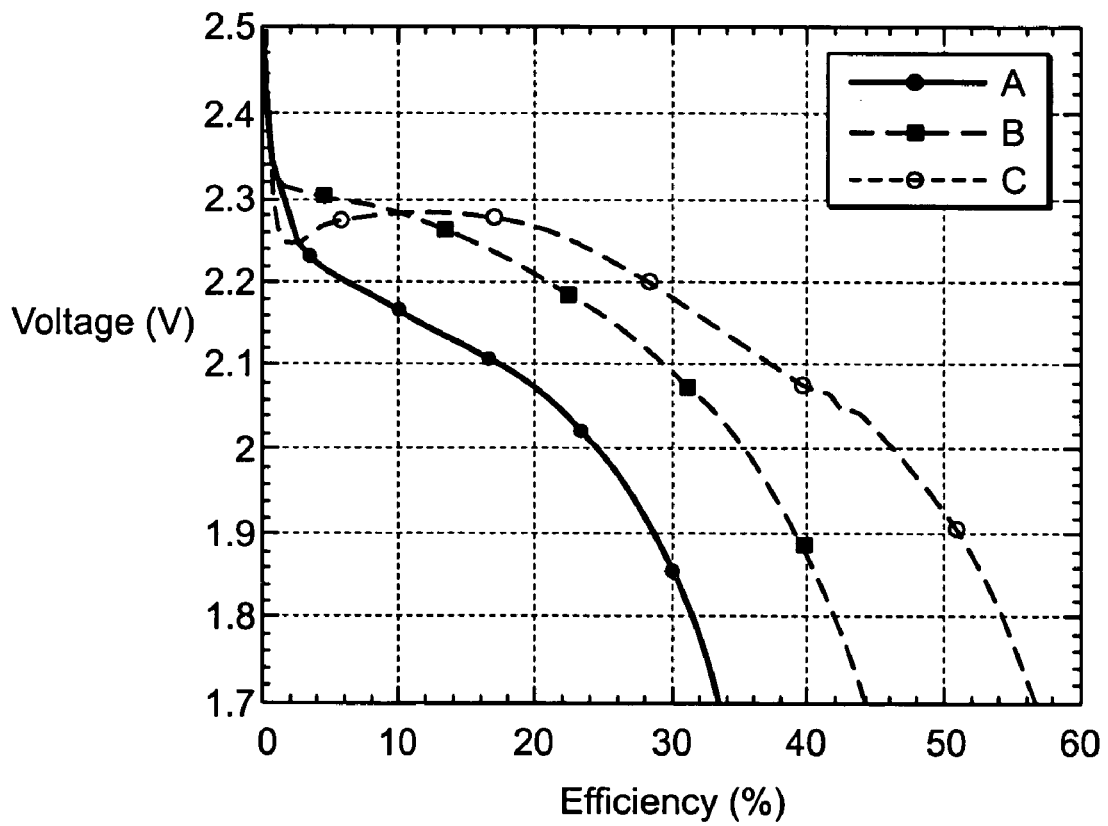
FIG. 5 is a graph showing load voltage versus efficiency for fresh test cells having aluminum cathode screens under an HEC (60 mA pulse) simulation.

Referring to FIG. 5, a graph showing voltage under highest current load versus efficiency for fresh coin cells having an aluminum screen as a cathode current collector under a HEC (60 mA pulse) simulation test is shown. The HEC (60 mA pulse) simulation test is used to simulate conditions corresponding to a high power HEC (high end camera) test for 2/3A cells. The test includes subjecting the test cells to number of pulses under constant current (3 second pulse, 7 second rest), and measuring voltage. The test was performed using an Arbin testing system, available from Arbin Co.

Test cells including LiTFS/LiPF$_6$/LiClO$_4$ salts were compared with test cells including LiTFS/LiClO$_4$ salts and test cells including LiPF$_6$ salt. Ten 2430 coin cells filled with an electrolyte (battery grade) supplied by Ferro Co. having 0.54M LiTFS, 0.36M LiPF$_6$, and 0.025% by weight LiClO$_4$ salts were tested. The LiClO$_4$ salt was added to the electrolyte to suppress corrosion of aluminum. For comparison, ten 2430 coin cells filled with an electrolyte (battery grade) supplied by Ferro Co. having 1 M LiPF$_6$ were also tested. Ten 2430 coin cells filled with an electrolyte (battery grade) supplied by Ferro Co. having 0.64M LiTFS and 0.025% by weight LiClO$_4$ salts were used as control cells.

As shown in FIG. 5, the cells including 0.54M LiTFS, 0.36M LiPF$_6$, 0.025% by weight LiClO$_4$ salts and 1 M LiPF$_6$ salt exhibited better performance relative to the control cells. Efficiency was calculated as a ratio of delivered capacity to a theoretical capacity. Corresponding performance data for different voltage cutoffs (VCO) are presented in Table 4.

TABLE 4

| Electrolyte | Efficiency, % (1.7 VCO) | Efficiency, % (1.5 VCO) |
|---|---|---|
| 0.64M LiTFS, 0.025% by weight LiClO$_4$ | 36.35 | 39.12 |
| 0.54M LiTFS, 0.36M LiPF$_6$, 0.025% by weight LiClO$_4$ | 44.56 | 47.79 |
| 1M LiPF$_6$ | 57.25 | 60.38 |

EXAMPLE 5

Referring to FIG. 6, a graph showing voltage under highest current load versus efficiency for stored (20 days@

60° C.) coin cells having an aluminum screen as a cathode current collector under the HEC (60 mA pulse) simulation test is shown.

Test cells including LiTFS/LiPF$_6$/LiClO$_4$ salts were compared with test cells including LiTFS/LiClO$_4$ salts and test cells including LiPF$_6$ salt. Ten 2430 coin cells filled with an electrolyte (battery grade) supplied by Ferro Co. having 0.54M LiTFS, 0.36M LiPF$_6$, and 0.025% by weight LiClO$_4$ were tested. The LiClO$_4$ salt was added to the electrolyte to suppress corrosion of aluminum. For comparison, ten 2430 coin cells filled with an electrolyte (battery grade) supplied by Ferro Co. having 1M LiPF$_6$ salt were also tested. Ten 2430 coin cells filled with an electrolyte (battery grade) supplied by Ferro Co. having 0.64M LiTFS and 0.025% by weight LiClO$_4$ were used as control cells. After assembly, the cells were stored for 20 days in a dispatch oven at 60° C.

As shown in FIG. 6, the cells including 0.54M LiTFS, 0.36M LiPF$_6$, 0.025% by weight LiClO$_4$ salts exhibited better performance relative to the control cells. Cells filled with the 1M LiPF$_6$ salt electrolyte exhibit poor performance (0 pulses) after storage. Efficiency was calculated as a ratio of delivered capacity to a theoretical capacity. Capacity retention was calculated as a ratio (%) of performance efficiency after and before storage. Corresponding performance data for different voltage cutoffs (VCO) are presented in Table 5.

TABLE 5

| Cell # | Efficiency, % (1.7 VCO) | Efficiency, % (1.5 VCO) | Capacity Retention, % (1.7 VCO) | Capacity Retention, % (1.5 VCO) |
|---|---|---|---|---|
| 0.64M LiTFS and 0.025% by weight LiClO$_4$ | 33.70 | 37.85 | 92.7 | 96.8 |
| 0.54M LiTFS, 0.36M LiPF$_6$, 0.025% by weight LiClO$_4$ | 43.86 | 47.23 | 98.4 | 98.8 |
| 1M LiPF$_6$ | 0 | 0 | 0 | 0 |

EXAMPLE 6

Referring to Table 6, the capacity retention of test cells after storage for 20 days at 60° C. is shown. Table 6 also shows performance data for test cells under the digital camera test at room temperature.

Test cells including LiTFS/LiPF$_6$ salts with relatively low cathode moisture content were compared with test cells including LiTFS/LiTFSI salts with relatively low cathode moisture content, and test cells including LiTFS/LiPF$_6$ salt with relatively high cathode moisture content. Ten 2/3A cells filled with an electrolyte (battery grade) supplied by Ferro Co. having 0.54M LiTFS and 0.36M LiPF$_6$ salts were tested. The cathode moisture content for these cells was in the range of 400-600 ppm. Ten 2/3A control cells filled with an electrolyte (battery grade) supplied by Ferro Co. having 0.54M LiTFS and 0.36M LiTFSI salts were also tested. The cathode moisture content for the control cells was in the range of 400-600 ppm. Ten 2/3A cells assembled with relatively higher moisture (HM) cathodes (cathode moisture content is in the range 1000-1500 ppm) and filled with an electrolyte (battery grade) supplied by Ferro Co. having 0.54M LiTFS and 0.36M LiPF$_6$ salts were also tested. After assembly, the cells were stored for 20 days in a dispatch oven at 60° C.

As shown in Table 6, after storage, the cells assembled with 400-600 ppm of moisture and 1000-1500 ppm of moisture including 0.54M LiTFS, 0.36M LiPF$_6$ electrolyte exhibited capacity retention, compared to the control cells. Capacity retention was calculated as a ratio (%) of delivered capacity after and before storage.

TABLE 6

| Test | Electrolyte | Capacity (Fresh) Cycle | Capacity (Fresh) Ah | Capacity (Stored) Cycle | Capacity (Stored) Ah | Capacity Retention (%) |
|---|---|---|---|---|---|---|
| RT, 2.0 V | 0.54M LiTFS, 0. LiTFSI | 130 | 0.892 | 123 | 0.847 | 95.0 |
| | 0.54M LiTFS, 0.36M LiPF$_6$ | 135 | 0.921 | 120 | 0.830 | 90.1 |
| | 0.54M LiTFS and 0.36M LiPF$_6$, HM | 116 | 0.806 | 107 | 0.745 | 92.4 |
| RT, 1.7 V | 0.54M LiTFS, 0.LiTFSI | 161 | 1.131 | 153 | 1.077 | 95.2 |
| | 0.54M LiTFS, 0.36M LiPF$_6$ | 163 | 1.136 | 150 | 1.064 | 93.7 |
| | 0.54M LiTFS and 0.36M LiPF$_6$, HM | 147 | 1.047 | 140 | 0.990 | 94.6 |
| RT, 1.5 V | 0.54M LiTFS, 0.LiTFSI | 168 | 1.182 | 162 | 1.147 | 97.0 |
| | 0.54M LITFS, 0.36M LiPF$_6$ | 168 | 1.180 | 159 | 1.132 | 95.9 |
| | 0.54M LiTFS and 0.36M LiPF$_6$, HM | 154 | 1.103 | 150 | 1.078 | 97.3 |

All publications, patents, and patent applications referred to in this application are herein incorporated by reference to the same extent as if each individual publication, patent, or patent application was specifically and individually indicated to be incorporated by reference.

Other embodiments are within the claims.

What is claimed is:

1. A primary electrochemical cell, comprising:
   a cathode comprising a cathode active material consisting of manganese oxide and/or iron disulfide, the cathode having less than about 2,000 ppm of water;
   a cathode current collector comprising aluminum;
   an anode comprising lithium; and
   an electrolyte comprising lithium trifluoromethanesulfonate, LiPF$_6$, and a third lithium salt selected from the group consisting of LiClO$_4$ and lithium-bis(oxalate) borate.

2. The cell of claim 1, wherein the cathode has less than 1,500 ppm of water.

3. The cell of claim 1, wherein the cathode has less than 1,000 ppm of water.

4. The cell of claim 1, wherein the cathode has less than 500 ppm of water.

5. The cell of claim 1, wherein the electrolyte comprises, in mole fraction, from 20% to 80% of lithium trifluoromethanesulfonate and from 20% to 80% of LiPF$_6$.

6. The cell of claim 1, wherein the electrolyte comprises from about 300 to about 10,000 ppm of $LiClO_4$.

7. The cell of claim 1, further comprising an aluminum surface.

8. The cell of claim 1, wherein the electrolyte further comprises a material selected from the group consisting of ethylene carbonate, propylene carbonate, dimethoxyethane, butylene carbonate, and dioxolane.

9. The cell of claim 1, wherein the electrolyte further comprises propylene carbonate and dimethoxyethane.

10. The cell of claim 9, wherein the electrolyte comprises from about 30% to about 90% by weight of dimethoxyethane.

11. The cell of claim 9, wherein the electrolyte further comprises ethylene carbonate.

12. The cell of claim 11, wherein the electrolyte comprises, by weight, from about 5% to about 30% of ethylene carbonate, and from about 30% to about 90% dimethoxyethane.

13. The cell of claim 1, wherein the electrolyte further comprises ethylene carbonate, butylene carbonate, and dimethoxyethane.

14. The cell of claim 13, wherein the electrolyte comprises, by weight, from about 5% to about 30% of ethylene carbonate, and from about 30% to about 90% of dimethoxyethane.

15. The cell of claim 1, wherein the electrolyte comprises dioxolane.

16. A method, comprising:
   discharging, only once, a primary electrochemical cell comprising
      a cathode comprising manganese oxide and/or iron disulfide, the cathode having less than about 2,000 ppm of water,
      a cathode current collector comprising aluminum,
      an anode comprising lithium, and
      an electrolyte comprising lithium trifluoromethanesulfonate, $LiPF_6$, and a third lithium salt selected from the group consisting of $LiClO_4$ and lithium-bis (oxalate) borate; and
   disposing the cell without recharging the cell.

* * * * *